United States Patent Office 3,795,615
Patented Mar. 5, 1974

3,795,615
HYDROGENATED COPOLYMERS OF BUTADIENE WITH ANOTHER CONJUGATED DIENE ARE USEFUL AS OIL ADDITIVES
James J. Pappas, 10 Trouville Drive, Parsippany, N.J. 07054; Henry S. Makowski, 2045 Winding Brookway, Scotch Plains, N.J. 07076; and Albert Rossi, 23 Roundtop Road, Warren, N.J. 07060
No Drawing. Filed July 28, 1972, Ser. No. 276,109
Int. Cl. C10m 1/18
U.S. Cl. 252—59    8 Claims

ABSTRACT OF THE DISCLOSURE

A hydrogenated copolymer of butadiene with a different conjugated diene, in which the diene monomer units in the polymer are predominantly in the 1,4-configuration, may be incorporated into mineral oil, in small amounts, to improve the viscosity index and depress the pour point of the oil.

BACKGROUND OF THE INVENTION

Field of the invention

This invention relates to polymeric oil additives and to lubricating oil compositions containing these compounds. More particularly, the present invention relates to hydrogenated copolymers of butadiene with different conjugated diene compounds and to lubricating oil compositions containing such copolymers.

Description of the prior art

Various copolymers of butadiene with other olefins are known as oil additives. Thus, U.S. Pat. No. 3,419,365 teaches hydrogenated copolymers of butadiene and styrene as pour point depressants for distillate fuel oil. Similarly, U.S. Pat. No. 3,393,057 teaches polymers of butadiene, $C_{10}$ to $C_{24}$ normal alpha-monoolefins and styrene or indene as a pour point depressant for fuel and lubricating oils U.S. Pat. No. 3,635,685 discloses pour point depressants comprising hydrogenated butadiene-styrene copolymers which contain a hydroxy, carboxy, or pyridyl terminal group.

U.S. Pat. No. 3,312,621 discloses polymers of conjugated diolefins which are predominantly in the 1,4-addition configuration, as viscostiy index (V.I.) improvers. Butadiene, isoprene, 1,3-pentadiene, and copolymers of such diolefins, are specifically disclosed as suitable.

U.S. Pat. No. 3,600,311 discloses viscosity index improvers of hydrogenated homopolymers of butadiene in which about 45 to 95 percent of the butadiene monomers are in the 1,4-configuration. Hydrogenated butadiene-styrene copolymers, as V.I. improvers, are disclosed in South African application No. 68/7,550.

It has now been found that V.I. improvers having increased shear stability may be prepared from certain hydrogenated butadiene-containing copolymers in which the diene monomer units present in the polymer are predominantly in the 1,4-configuration. The polymers of the present invention have greatly improved oxidative stability over the unhydrogenated conjugated diene polymers of U.S. Pat. No. 3,312,621 and are substantially more soluble in oil than hydrogenated polybutadiene homopolymers which are predominantly in the 1,4-addition configuration.

SUMMARY OF THE INVENTION

The hydrogenated copolymers of the present invention comprise 10 to 90 mole percent butadiene units and at least one comonomer. The comonomer may be a conjugated diene of the formula

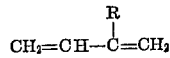

wherein R is a $C_1$ to $C_6$ alkyl group.

About 75 to 95 percent of the diene monomers present in the polymer are in the 1,4-configuration. The number average molecular weight of the hydrogenated copolymers is in the range of 2,000 to 200,000 and preferably in the range of 20,000 to 150,000.

The hydrogenated polymers of the present invention can be employed as viscosty index improvers in lubricating oils or as a pour point depressant for such oils.

DETAILED DESCRIPTION

The polymers of the present invention are preferably prepared by anionic polymerization. This method of polymerization offers certain unique advantages which makes it extremely useful in the synthesis of the polymers of the present invention. In particular, by the use of anionic polymerization, it is possible to obtain polymers having a narrow molecular weight distribution, to obtain random or block polymers, and to control the microstructure of the polymers derived from conjugated diolefins.

Anionic polymerization is characterized by the addition of a negative ion to the monomer. Unlike free-radical polymerization reactions, anionic polymerizations have no facile chemical termination step. Of course, termination reactions do occur, but under carefully selected conditions with the monomers of the present invention, using inert solvents and highly pure reactants, the end groups have indefinite lifetimes. The non-terminated chains derived from anionic homopolymerization can be used for the synthesis of block polymers by sequential addition of different monomers. Thus anionic polymerization offers flexibility in allowing either block or random polymers to be readily produced. Polymers with narrow molecular weight distribution have better shear stability than those with broader distributions. Of course, shear stability is a desirable property in polymers used as viscosity index improvers.

Anionic polymerization generally offers a wider latitude of techniques for producing varied microstructures of conjugated diolefin polymers. With diene monomers, 1,4- and 1,2-addition can be regulated by the appropriate combination of reaction conditions, i.e., catalyst, solvent type, and temperature. Polybutadienes predominantly in the 1,4-configuration are more effective in increasing the V.I. than polybutadienes predominantly in the 1,2-configuration.

The polymers of the present invention may be conveniently prepared with known metallic and organometallic catalysts such as lithium metal or sodium metal and organo-lithium or organosodium catalysts. Suitable organolithium catalysts may be represented by the formula RLi wherein R is a $C_2$ to $C_{20}$, and preferably $C_3$ to $C_{10}$, alkyl, aralkyl, or cycloalkyl group. Specific examples of suitable catalysts include n-propyllithium, isopropyllithium, n - butyllithium, tertiary-butyllithium, n - decyllithium, benzyllithium, 4 - phenyl-n-butyllithium, cyclohexyllithium, 4-cyclohexyl-n-butyllithium, etc. Particularly preferred are the butyllithiums, i.e., normal- sec-, iso-, and tertiary-butyllithiums.

An inert diluent, in which the catalyst is soluble, may be employed. By "inert" it is meant that the diluent does not react, although the nature of the solvent may affect the relative amount of 1,2- and 1,4-configuration that is obtained. The inert diluent will generally be a hydrocarbon free of olefinic unsaturation containing from 3 to 16 carbon atoms. Suitable inert diluents include aliphatics, such as n-pentane, n-hexane, isooctane, n-nonane, etc.; alicyclics, such as cyclopentane, cyclohexane, cycloheptane, etc.; and aromatics, such as benzene, toluene, xylene, chlorobenzene, etc. The amount of diluent employed in the preparation is not critical, except that sufficient amounts should be used to solubilize the amount of organo-lithium catalyst used. Generally, 0.5 to 200, preferably 1 to 50 liters of the diluent per gram mole of organo-lithium catalyst are employed during the preparation of the polymer.

The amount of catalyst employed primarily depends upon the degree of polymerization desired. The term "degree of polymerization," as employed herein, means the total number of monomeric units present in the polymer. Ordinarily, each mole of organo-lithium catalyst will generate a mole of polymers. Thus, "degree of polymerization" may be conveniently defined by the generalization:

Degree of polymerization
$$= \frac{\text{total moles of monomer}}{\text{moles of organo-lithium catalyst}}$$

Since to obtain the desired molecular weights, the average number of monomeric units in the polymer will generally be about 30 to 3,333, about 0.0003 to about 0.033 mole of organo-lithium catalyst, per mole of monomer will ordinarily be utilized.

The polymerization reaction generally takes place at about $-50°$ to about $150°$ C., and preferably at $20°$ to $60°$ C. Reaction times as short as 20 minutes, or as long as 75 hours, may be employed. Preferably, the polymerization reaction is carried out for from 40 minutes to 24 hours. Reaction pressure is not critical; pressures may range from atmospheric to superatmospheric. Preferably, for economy and ease of handling, atmospheric pressure is preferred.

Preferably, the monomers and the catalyst are merely mixed together, whereby a random copolymer is obtained. However, the monomers may be added sequentially whereby block copolymers may be obtained. For example, one of the monomers, in the presence of the catalyst, may be allowed to polymerize for a period of time, e.g., 2 hours, after which time the second monomer is added to the reaction solution.

The polymers can be recovered by procedures well known in the art. For example, polar materials, such as water or $C_1$ to $C_5$ alkanols can be added to inactivate the catalyst. Preferably, the reaction is terminated by dropping the reaction system into 2 to 10 volumes of methanol containing about 0.1 weight percent antioxidant. After termination of the reaction, the hydrocarbon solution is washed with water or dilute mineral acid. Alternatively, the active polymer solution can be treated with hydrated clays, such as natural Attapulgus clay, which functions to both inactivate the catalyst and to chemically absorb the lithium component. The polymer may be recovered by filtering the resultant polymer solution, drying if necessary, and stripping of remaining inert diluent at elavated temperatures (e.g., $70°$ to $120°$ C.) and reduced pressures (e.g., 0.1 to 100 mm. Hg). For the isolation of higher molecular weight polymers steam stripping or precipitation with anti-solvents is preferred.

The hydrogenated polymers of the present invention comprise 10 to 90 mole percent, and preferably 25 to 75 mole percent, butadiene units. In preparing the polymers, the monomers should be used in the ratio desired in the polymer. In other words, if a polymer containing 90 mole percent butadiene and 10 mole percent of the comonomer is desired, the monomers should be employed in the reaction composition in the ratio of 90 mole percent butadiene to 10 mole percent comonomer. About 75 to 95 percent, and preferably greater than 90 percent, of the diene monomer units present in the polymer are in the 1,4-configuration.

While various conjugated dienes of the formula

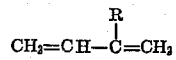

may be employed, isoprene is a preferred comonomer. Desirable polymers may also be prepared from butadiene and two or more of the comonomers. Suitable polymers comprise 10 to 90 mole percent butadiene units, 10 to 90 mole percent of units of the different conjugated diene, and 0 to 25 mole perecnt of $C_8$ to $C_{20}$ monovinyl aromatic compounds and/or aromatic-substituted dienes.

Examples of suitable $C_8$ to $C_{20}$ monovinyl aromatic comonomers which may be employed to produce the polymers of the present invention include alpha-methyl styrene, vinyl toluene, t-butyl styrene, vinyl biphenyl, vinyl naphthalene, etc. Suitable aromatic-substituted dienes include 1-phenyl butadiene, 2-phenyl butadiene, 2,6-diphenyl-1,5-hexadiene, etc.

The structures of the polymers of the present invenvention may be illustrated with reference to butadiene-isoprene copolymers. The final hydrogenated polymers will have saturated backbones with pendant methyl, ethyl and isopropyl groups. The amounts of the various groups will depend upon the amount of 1,4-, 1,2-, and 3,4-addition products present in the original unhydrogenated structure. For purposes of illustration, the unhydrogenated structures of all possible polybutadienes and polyisoprenes are shown below:

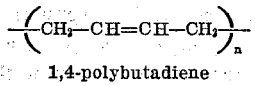

1,4-polybutadiene

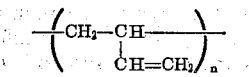

1,2-polybutadiene

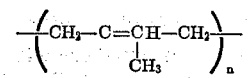

1,4-polyisoprene

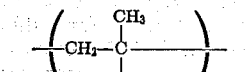

1,2-polyisoprene

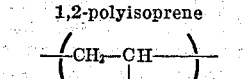

3,4-polyisoprene

Hydrogen 1,4-polybutadiene is not useful as a viscosity index improver, since the final product is an oil-insoluble polyethylene. Hydrogenated polybutadienes with the appropriate amount of 1,2-structure would give the necessary solubility and would have viscosity index improving properties. However, it is necessary to very precisely control the amount of 1,2-structure formed. If an inadequate amount of 1,2- structure is formed, the polymer is not sufficiently soluble; if too much 1,2-structure is formed, the polymer is not as effective in increasing the V.I. When polybutadiene is anionically polymerized to the high degree of polymerization needed for viscosity index improvers (molecular weights of greater than 20,000), it is very difficult to obtain precise control of the amount of 1,2-addition product by variations in reaction conditions.

1,4-polyisoprene, upon hydrogenization, would give an alternating ethylene-propylene copolymer which would have reasonably good viscosity index improving characteristics. However, hydrogenated polyisoprene is inferior to the copolymer of the present invention in shear stability, $0°$ F. viscosity, and thickening efficiency.

A hydrogenated random butadiene-isoprene copolymer in which the diene monomers are primarily in the 1,4-configuration would have the structure:

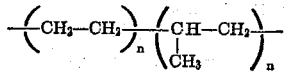

By controlling the ratio of butadiene and isoprene in the anionic polymerization under conditions which give predominantly 1,4-addition, it is possible to obtain a wide range of ethylene to propylene ratio in the hydrogenated product.

The polymers of the present invention, prepared from the preferred comonomer (isoprene) have structures similar, but not identical, to ethylene-propylene copolymers prepared with a Ziegler-type catalyst. Ethylene-propylene copolymers contain some propylene-propylene linkages which are not possible in the polymers of the present invention. Furthermore, the polymers of the present invention contain some 1,2-addition products and some 3,4-addition products. Thus, the butadiene-isoprene copolymers of the present invention contains some ethyl and isopropyl side chains which are not possible with ethylene-propylene copolymers. In addition, hydrogenated polymers of the present invention, prepared by anionic polymerization, have a narrower molecular weight distribution ($M_w/M_n$ less than 2) than Ziegler-type ethylene-propolyene copolymers.

The hydrogenation of the polymers of the present invention is carried out using conventional hydrogenation procedures. The polymer is diluted with an inert solvent, such as those previously mentioned, and the polymer solution and hydrogenation catalyst are added to a high pressure autoclave. The autoclave is pressured with hydrogen to about 100 to 3,000 p.s.i.g., and then heated to 50° to 220° C. (preferably 75° to 150° C.), for about 1 to 24 hours (preferably 2 to 10 hours), while mixing. The reactor is then depressurized, the catalyst removed by filtering, and the hydrogenated polymer recovered from the solvent simply by evaporating the solvent.

The hydrogenation catalyst will generally be used in an amount of 0.1 to 20 weight percent based upon the weight of the polymer to be hydrogenated. The specific amount of catalyst employed depends somewhat upon the specific catalyst used. Any material functioning as an olefin hydrogenation catalyst can be used; suitable catalysts include Raney nickel, platinum oxide, platinum on alumina, palladium or charcoal, copper chromate, nickel supported on kieselguhr, molybdenum sulfide, and the like. The best hydrogenation results were obtained with Raney nickel, in large excess, at high temperatures and pressure.

After polymerization and hydrogenation, the resulting polymer can be used as a viscosity index improver in hydrocarbon lubricating oil in an amount of 0.4 to 4.0 weight percent, and preferably 0.8 to about 2.5 weight percent, based upon the weight of the oil to be treated. Concentrations of 1 to 20 weight percent of the polymer in mineral oil may be prepared for ease of handling.

The polymers of the present invention may be used as a sole oil additive, or in combination with other conventional oil additives, such as pour point depressants, dewaxing aids, flow improvers, corrosion inhibitors, antioxidants, sludge inhibitors, etc.

DESCRIPTION OF THE PREFERRED EMBODIMENTS

The following examples will serve to illustrate methods of preparing the compositions of the present invention and include preferred embodiments of the invention.

Example 1

Under anhydrous and anaerobic conditions, 350 ml. of benzene and 0.92 meq. n-butyllithium were charged to a polymerization vessel. Simultaneously, 48.4 g. (0.711 mole) of isoprene and 15.4 g. (0.286 mole) butadiene at −5° C. were then added to the vessel. The solution was stirred for 45 minutes at the end of which time the temperature reached 68° C. The reaction was terminated with 1 ml. of methanol, and the copolymer was isolated by precipitating with a large volume of methanol containing 0.1 percent by weight phenyl-2-naphthylamine.

The copolymer was dried in a vacuum oven at 80° C. for 24 hours, after which 58.1 grams of the copolymer were recovered (a yield of 91 percent). The copolymer contained about 71 mole percent isoprene. The polymer had an $M_n$ of 69,300 and approximately 90 percent of the diene monomer units were in the 1,4-configuration.

Water was decanted from Raney nickel and the catalyst washed three times with water and the water decanted. The catalyst was then washed approximately 10 times with isopropanol and the isopropanol decanted. The catalyst was placed in a dry box and just before use, 25 g. were weighed out and washed 5 times with cyclohexane.

Hydrogenation was carried out by placing 5.0 g. of the polymer in 150 ml. of cyclohexane and 25 grams of Raney nickel (wet over cyclohexane) in a 300 ml. stainless steel bomb. Charging was done in a dry box and the bomb was kept under nitrogen. The bomb was pressurized with hydrogen to 3,600 p.s.i. and hydrogenation was conducted at 250° C. for 16 hours. After completion of the hydrogenation, the catalyst was filtered off and the product washed twice with 50 ml. of cyclohexane. The cyclohexane was evaporated and the residue dried at 90° C. under a vacuum (1 mm. Hg). A yield of 4.52 g. of hydrogenated butadiene-isoprene copolymer was obtained.

Example 2

Polymerization was carried out as in Example 1, using 1.20 meq. of n-1-butyllithium, 22.8 g. (0.334 mole) isoprene and 34.8 g. (0.644 mole) butadiene. The copolymer contained approximately 33 mole percent isoprene. The product had an $M_n$ of 48,000 and approximately 90 percent of the diene monomer are in the 1,4-configuration.

Hydrogenation was carried out as in Example 1 except that a temperature of 200° C. rather than 240° C. was employed.

Example 3

To demonstrate the viscosity index improving characteristics, the polymers of Examples 1 and 2 were blended with STS–ENJ–102, a mineral lube oil. This oil was a blend of two basic oils. Both oils were paraffinic, solvent refined, neutral oils. The first had a viscosity of about 150 SUS at 100° F. and constituted 25.75 weight percent of the blend. The second oil had a viscosity of about 300 SUS and constituted 73.75 weight percent of the blend. The blend also contained 0.5 weight percent of a polymeric pour point depressant.

Polyisobutylene (Paratone N), a comercial viscosity index improver, was also blended with the test oil, and the stability of the compositions tested by determining the extent of viscosity loss in a sonic breakdown test. The sonic breakdown test is a measure of shear stability and is conducted according to the procedure described in ASTM standards, vol. 1 (1961) p. 1160, "Test for Shear Stability of Polymer-Containing Oils." The results of these tests are summarized in Table 1.

TABLE 1.—COMPARISON OF HYDROGENATED BUTADIENE-ISOPRENE COPOLYMERS WITH COMMERCIAL VI IMPROVER

| Polymer composition | Amount of polymer in STS–ENJ–102, percent | KV at 210° F., cs.[1] | 0° F., vis., CCS (poise)[2] | Percent vis. loss in sonic oscillator[3] |
|---|---|---|---|---|
| Hydrogenated butadiene-isoprene (71 mole percent isoprene) | 1.22 | 12.72 | 23.5 | 6 |
| Hydrogenated butadiene-isoprene (33 mole percent isoprene) | 1.47 | 12.56 | 20.7 | 1 |
| Polyisobutylene (Paratone N) | 2.00 | 12.46 | 26.0 | 28 |

[1] Determined in accordance with ASTM D445.
[2] Determined in accordance with ASTM D2602.
[3] Run at 0.75 amps and 40° C. for 15 minutes according to ASTM standards, vol. 1 (1961) page 1,160.

As the data in Table 1 shows, not only is the shear stability of the hydrogenated butadiene-isoprene copolymers superior to that of the commercial viscosity index improver, Paratone N, the 0° F. viscosity (CCS) is also substantially improved. The polymers of the present invention also exhibit improved thickening efficiency.

The invention in its broader aspects is not limited to the specific details shown and described and departures may be made from such details without departing from the principles of the invention and without sacrificing its chief advantages.

What is claimed is:

1. A composition comprising
 (a) a major amount of a lubricating oil composition and
 (b) from about 0.4 to about 4.0 percent by weight, based upon the weight of the lubricating oil, of a hydrogenated copolymer of 10 to 90 mole percent of butadiene and at least one comonomer selected from the group consisting of conjugated dienes of the formula

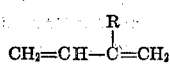

wherein R is a $C_1$ to $C_6$ alkyl group, wherein about 75 to 95 percent of the diene monomers are in the 1,4-configuration in the polymer and wherein the olefinic bonds are substantially saturated during the hydrogenation.

2. The composition of claim 1 which contains from about 0.8 percent to about 2.5 percent by weight, based on the weight of the lubricating oil of said hydrogenated copolymer.

3. The composition of claim 1 in which said hydrogenated copolymer contains up to 25 mole percent of an additional comonomer selected from the group consisting of $C_8$ to $C_{20}$ monovinyl aromatic compounds and aromatic substituted dienes.

4. The composition of claim 1 in which said comonomer of said hydrogenated copolymer is isoprene.

5. The composition of claim 1 in which said hydrogenated copolymer has a number average molecular weight in the range of about 2,000 to about 200,000.

6. The composition of claim 1 in which said hydrogenated copolymer has a number average molecular weight in the range of about 40,000 to about 150,000.

7. The composition of claim 1 in which said hydrogenated copolymer contains about 25 to about 75 mole percent butadiene units.

8. The composition of claim 1 in which at least 90 percent of the diene monomer units of said hydrogenated copolymer are in the 1,4-configuration.

References Cited

UNITED STATES PATENTS

| | | |
|---|---|---|
| 2,798,853 | 7/1957 | Young et al. _____ 252—59 X |
| 3,089,832 | 5/1963 | Black et al. _____ 252—59 X |

FOREIGN PATENTS

| | | |
|---|---|---|
| 1,033,456 | 6/1966 | Great Britain. |

DANIEL E. WYMAN, Primary Examiner
W. H. CANNON, Assistant Examiner

U.S. Cl. X.R.
260—82.1, 96 Hy